US009714867B2

(12) United States Patent
Backes

(10) Patent No.: US 9,714,867 B2
(45) Date of Patent: Jul. 25, 2017

(54) MONOLITHICALLY CONSTRUCTED RADIATION DETECTION DEVICE

(71) Applicant: TRW Automotive Electronics & Components GmbH, Radolfzell (DE)

(72) Inventor: Ulrich Backes, Radolfzell (DE)

(73) Assignee: TRW Automotive Electronics & Components GmbH (DE)

( * ) Notice: Subject to any disclaimer, the term of this patent is extended or adjusted under 35 U.S.C. 154(b) by 125 days.

(21) Appl. No.: 14/647,994

(22) PCT Filed: Nov. 29, 2013

(86) PCT No.: PCT/EP2013/075092
§ 371 (c)(1),
(2) Date: May 28, 2015

(87) PCT Pub. No.: WO2014/086678
PCT Pub. Date: Jun. 12, 2014

(65) Prior Publication Data
US 2015/0300883 A1    Oct. 22, 2015

(30) Foreign Application Priority Data

Dec. 3, 2012    (DE) .................. 10 2012 111 716

(51) Int. Cl.
| G01J 5/00 | (2006.01) |
| G01J 5/10 | (2006.01) |
| G01S 3/785 | (2006.01) |
| H02K 33/18 | (2006.01) |
| B60R 16/02 | (2006.01) |

(52) U.S. Cl.
CPC ............. G01J 5/10 (2013.01); B60R 16/02 (2013.01); G01J 5/00 (2013.01); G01J 5/0025 (2013.01); G01S 3/785 (2013.01); H02K 33/18 (2013.01)

(58) Field of Classification Search
CPC ....... G01J 5/10; G01J 5/00; G01J 1/20; G01C 21/02; G01C 21/24; F24J 2/02; F24J 2/38; F24J 2/54
USPC .......... 250/338.3, 203.1, 203.2, 203.3, 203.6
See application file for complete search history.

(56) References Cited

U.S. PATENT DOCUMENTS

| 6,283,601 B1 | 9/2001 | Hagelin et al. |
| 2003/0227700 A1 | 12/2003 | Mizuno et al. |
| 2008/0237349 A1* | 10/2008 | Urey ................. H02K 33/18 235/462.32 |

(Continued)

FOREIGN PATENT DOCUMENTS

| DE | 19757847 | 7/1999 |
| DE | 19949969 | 4/2001 |

(Continued)

*Primary Examiner* — David Porta
*Assistant Examiner* — Meenakshi Sahu
(74) *Attorney, Agent, or Firm* — Tarolli, Sundheim, Covell & Tummino LLP

(57) ABSTRACT

There is provided a radiation detection means (10) which includes a carrier (12) with at least one pivotable portion (16), a receiving unit (18), a drive (24) and an evaluation and control unit. The receiving unit (18) is arranged on the pivotable portion (16) which together with the receiving unit (18) is pivotable about at least one axis relative to the carrier (12). The evaluation and control unit is connected with the drive (24) and the receiving unit (18) and the drive (24) is associated to the pivotable portion (16).

20 Claims, 3 Drawing Sheets

(56) References Cited

U.S. PATENT DOCUMENTS

2012/0305747 A1* 12/2012 Yeh .......................... G01J 1/20
  250/203.4

FOREIGN PATENT DOCUMENTS

| | | |
|---|---|---|
| DE | 602 04 534 | 3/2006 |
| DE | 60311423 | 10/2007 |
| DE | 69637351 | 11/2008 |
| EP | 0 774 681 | 5/1997 |
| EP | 1470026 | 1/2007 |
| EP | 0774681 | 12/2007 |
| WO | 02/25349 | 3/2002 |

* cited by examiner

MONOLITHICALLY CONSTRUCTED RADIATION DETECTION DEVICE

RELATED APPLICATIONS

This application corresponds to PCT/EP2013/076092, filed Nov. 29, 2013, which claims the benefit of German Application No. 10 2012 111 716.0, filed Dec. 3, 2012, the subject matter, of which are incorporated herein by reference in their entirety.

BACKGROUND OF THE INVENTION

This invention relates to a radiation detection means which detects a radiation source and in addition can track the radiation source. There is furthermore provided a safety and vehicle assistance system which comprises such radiation detection means and a method for controlling such radiation detection means.

Radiation detection means are known in principle from the prior art. Typically, such radiation detection means consist of a plurality of individual sensors, which by means of a complex image processing algorithm can determine the position of a radiation source. For example, all light sources are selected from a detected image with respect to the position and light intensity and merely the maximum is extracted. When a plurality of radiation sources now are to be tracked, this will increase the expenditure both of hardware and of software. On the one hand, the development expenditure is increased thereby and on the other hand also the costs, in order to be able to use such system.

DE 602 04 534 T2 discloses an auxiliary device including a radiation receiving unit that is arranged in a housing so as to be pivotable on a plate. The plate has a drive associated therewith, allowing the plate along with the radiation receiving unit to be pivoted relative to the housing.

SUMMARY OF THE INVENTION

Therefore, it is the object of the invention to reduce the hardware and software expenditure, whereby the costs also are reduced correspondingly.

According to the invention, this object is solved by a radiation detection means which includes a carrier with at least one pivotable portion, a receiving unit, a drive and an evaluation and control unit, wherein the receiving unit is arranged on the pivotable portion which together with the receiving unit is pivotable about at least one axis relative to the carrier, wherein the evaluation and control unit is connected with the drive and the receiving unit, and the drive is associated to the pivotable portion. Furthermore, the carrier is constructed monolithically with the pivotable portion.

The basic idea of the invention consists in that merely one receiving unit per radiation source is used, wherein this one receiving unit can follow the movement of the radiation source in that the pivotable portion is pivoted corresponding to the movement of the radiation source. Due to the configuration according to the invention the hardware and software expenditure can be lowered distinctly, as per radiation source merely one receiving unit is used. As a result of the monolithic construction, furthermore an extremely inexpensive and space-saving means is provided, as the pivotable portion is worked out, in particular etched out from the carrier, wherein the pivotable region remains connected with the carrier.

In a preferred embodiment it is provided that the carrier is a chip, in particular a silicon chip. This offers the advantage that the radiation detection means can be manufactured as a means with a compact design.

In particular, there is provided a collecting lens which cooperates with the receiving unit. The collecting lens collimates or collects the radiation, so that the receiving unit also can detect radiation sources of weaker intensity and the detection range of the radiation detection means is increased.

Preferably, the receiving unit is of the single-channel type, whereby the hardware and software expenditure is reduced correspondingly.

In a preferred embodiment, the drive is electrodynamic. Hence, a reliable drive is provided, which is able to pivot the pivotable portion of the radiation detection means. Due to the design as electric drive it is furthermore ensured that the radiation detection means has a compact design.

Preferably, at least one conductor path is arranged on the pivotable region in a coil-shaped manner. The conductor path which can be provided for the power supply of the radiation detection means thus can be used as part of the electrodynamic drive, so that few additional means must be provided for the drive. By feeding current into the conductor path, a magnetic field is generated due to the coil-shaped configuration. The conductor path accordingly acts as drive coil.

In particular, there is provided a permanent magnet which is associated to the pivotable region, wherein this permanent magnet cooperates with the conductor path arranged in a coil-shaped manner, i.e. with the drive coil, so that the electrodynamic drive is provided. Thus, a compact, simple and inexpensive drive possibility is provided for the radiation detection means, wherein merely the permanent magnet must be incorporated as additional means.

In an alternative embodiment it is provided that the drive is electrostatic. Such electrostatic drive can be advantageous for applications in which merely very small magnetic fields are allowed to occur.

In a preferred embodiment the receiving unit is a photodiode, so that the radiation detection means reacts to radiation sources in the form of light sources. The photodiode can be adapted to certain wavelength ranges, so that the radiation detection means responds to corresponding light sources.

In a further embodiment it is provided that the receiving unit is a bolometer, so that the radiation detection means is formed to detect thermal radiation. This is advantageous in particular when the radiation detection means is to be used for the detection of living beings or other objects radiating heat.

In a preferred embodiment it is provided that the pivotable portion is adjustable about two axes which are vertical to each other. Thus, it is ensured that the radiation detection means has a rather large detection range, which comprises the complete plane lying before the radiation detection means.

In particular, two drives are provided, which are of the electrodynamic and/or electrostatic type, wherein one drive is provided for pivoting the pivotable portion about one axis each. The configuration of the radiation detection means with two drives ensures that the radiation detection means adjustable about two axes also can be adjusted about one axis only, if this corresponds to the movement of the radiation source.

In a particularly preferred embodiment it is provided that two or more pivotable portions are provided, which each include a receiving unit. Hence, it is ensured that such radiation detection means can be constructed such that a plurality of radiation sources each can be tracked by a single radiation detection means, as per radiation source one receiving unit is provided, wherein this receiving unit is arranged on a pivotable portion which can be pivoted corresponding to the movement of the associated radiation source.

It can be provided that the carrier is formed with a plurality of pivotable portions or that a plurality of carriers are formed independent of each other. The plurality of detection means can be connected with an evaluation and control unit or to each detection means an evaluation and control unit can be associated. The concrete configuration is adaptable to the requirements.

Furthermore, there is provided a safety and vehicle assistance system for a motor vehicle with at least one radiation detection means as described above, wherein the safety and vehicle assistance system operates proceeding from the received signals of the radiation detection means.

In the preferred embodiment it is provided that the radiation detection means detects the position of a body part of a vehicle occupant, in particular the position of a head. Thus, for example the airbag can be triggered corresponding to the head position of a vehicle occupant, wherein the inflation speed or the inflation volume of the airbag can be controlled correspondingly. Alternatively, an alertness assistant also can be controlled by the position of the head, which assistant reacts when the head assumes a position untypical for a vehicle operator. Furthermore, the radiation detection means can detect the band of a vehicle occupant as thermal radiation source, so that by means of the radiation detection means a gesture control of the on-board electronics is possible.

In an alternative embodiment of the safety and vehicle assistance system it is provided that the radiation detection means detects the position of radiation sources of oncoming and/or preceding vehicles and/or living beings. Thus, for example a high-beam assistance system can recognize an oncoming vehicle due to the headlights and dim the lights correspondingly, or the radiation detection means detects the position of the taillights of a preceding vehicle, wherein the distance to this vehicle is controlled correspondingly. Furthermore, it can be provided that the radiation detection means detects thermal radiation, so that living beings can be recognized, which for example are present in the dark on the roadside or on the road.

Furthermore, there is provided a method for controlling a radiation detection means as described above, which comprises the following steps:

a) evaluating the radiation intensity of a radiation source received by the receiving unit by the evaluation and control unit, b) evaluating the angular incidence of the radiation emitted by the radiation source by the evaluation and control unit, c) pivoting the pivotable portion about at least one axis by controlling a drive by means of energization by the evaluation and control unit, wherein steps a) to c) can be repeated iteratively any number of times. With this method it is ensured that the radiation receiving means, in particular the receiving unit which is arranged on the pivotable portion, can follow the position of the radiation source. The pivotable portion is driven by the drive such that the intensity of the radiation received in the receiving unit is increased.

In a preferred embodiment it is provided that the evaluation and control unit can be associated to a plurality of receiving units, whereby the compactness is further increased, as merely one evaluation and control unit is provided for a plurality of receiving units. Corresponding to the method described above, the evaluation and control unit also is able to correspondingly control a plurality of these receiving units.

A passive radiation source also is to be regarded as radiation source in the sense of the invention, which means that an object which is illuminated and reflects the radiation also represents a radiation source in the sense of the invention.

BRIEF DESCRIPTION OF THE DRAWINGS

Further features and advantages of the invention can be taken from the following description and from the following drawings, to which reference is made. In the drawings.

DESCRIPTION OF EMBODIMENTS

Figure 1:
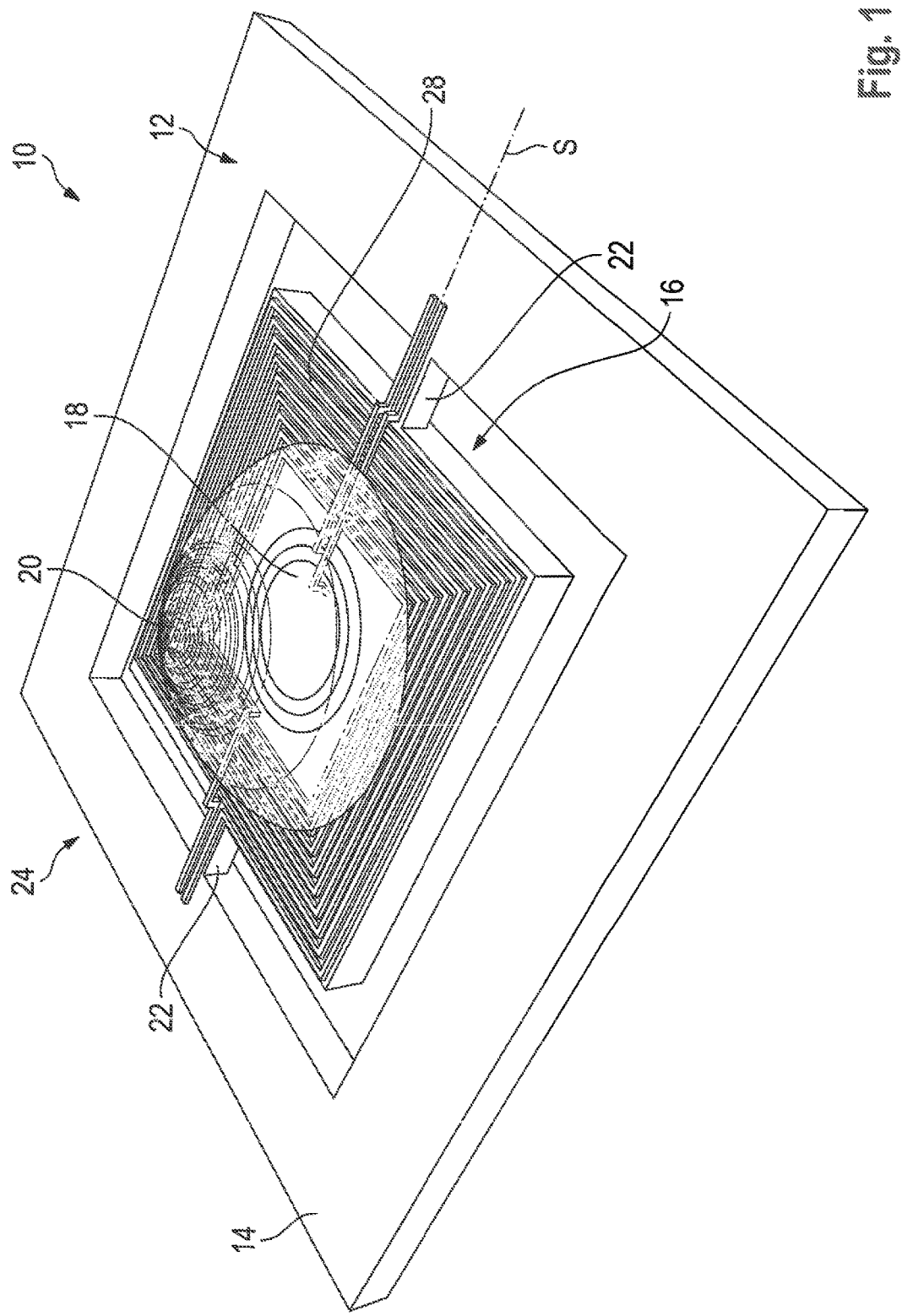
FIG. 1 shows a radiation detection means which is pivotable about one axis.

FIG. 1 shows a radiation detection means 10 according to the invention, which includes a carrier 12 which consists of a frame-like element 14 and a pivotable portion 16.

On the pivotable portion 16 a receiving unit 18 is arranged, which serves for the detection of radiation. To the receiving unit 18 arranged on the pivotable portion 16 a collecting lens 20 is associated, so that the detection range of the receiving unit 18 is increased. The receiving unit 18 preferably is arranged in the focus of the collecting lens 20.

In the embodiment shown, the pivotable portion 16 is pivotable about a swivel axis S. This swivel axis S is defined by webs 22 which connect the pivotable portion 16 with the carrier 12. The pivotable portion 16 can be milled out of the carrier 12, wherein the carrier can be a milled printed circuit board, in particular a chip.

For pivoting the pivotable portion 16 a drive 24 is required, which is shown only in part. The drive 24 shown in this embodiment is an electrodynamic drive 24, which among other things is formed of a non-illustrated permanent magnet 26 which is associated to the pivotable portion 16. As further element of the electrodynamic drive 24, at least one conductor path 28 is arranged on the pivotable portion 16 in a coil-shaped manner, so that the conductor path 28 forms a drive coil of the drive 24. By energizing the conductor path 28, the pivotable portion 16 can pivot about the swivel axis S formed of the webs 22 due to the interaction with the permanent magnet 26.

Thus, the pivotable portion 16 with the receiving unit 18 arranged thereon can be pivoted relative to the carrier 12 by up to 20°, so that a correspondingly large detection range is covered.

Figure 2:
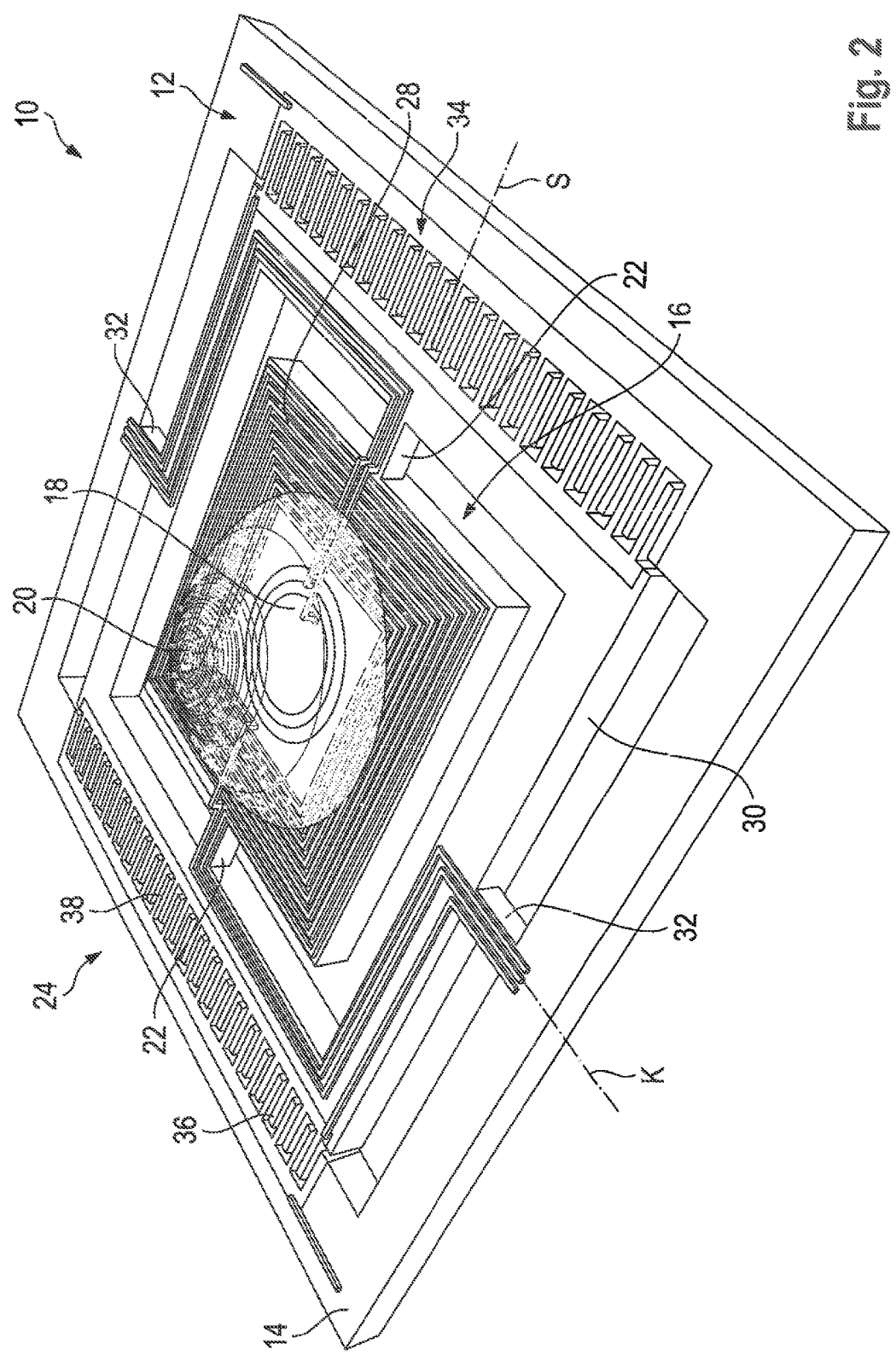
FIG. 2 shows a radiation detection means which is pivotable about two axes.

FIG. 2 shows a further embodiment of the radiation detection means 10 according to the invention, wherein the pivotable portion 16 is pivotable about two axes. For this purpose, the radiation detection means 10 includes a carrier 12 which as compared to the carrier 12 described above includes a further tilting region 30 beside the frame-like element 14 and the pivotable portion 16. The tilting region 30 is tiltable about a tilting axis K. The carrier 12 of this embodiment is arranged such that the frame-like element 14 encloses the tilting region 30, wherein the tilting region 30 is connected with the frame-like element 14 via tilting webs 32. The pivotable portion 16, which is arranged in the middle of the carrier 12, is arranged at the tilting region 30 with the tilting webs 22. The swivel and tilting axes S, K formed by the swivel webs 22 and the tilting webs 32 are vertical to each other.

Like in the embodiment shown above, the receiving unit 18 and the collecting lens 20 again are associated to the pivotable portion 16. In addition, the conductor path 28 in turn is arranged on the pivotable portion 16 in a coil-shaped manner, so that it forms the drive coil of the drive 24. The permanent magnet 26, which is associated to the pivotable portion 16, is not shown. In the embodiment shown, the drive 24 for the pivotable portion 16 accordingly is of the electrodynamic type.

To the tilting region 30 an electrostatic drive 34 is associated. The electrostatic drive 34 includes a comb structure, wherein at the frame-like element 14 a comb structure 36 and at the tilting region 30 an opposite comb structure 38 is formed, wherein the comb structures 36, 38 engage in each other and thus form the electrostatic drive 34. By energizing the electrostatic drive 34, the tilting region 30 tilts about the tilting axis K which is formed by the tilting webs 32. During tilting of the tilting region 30, the pivotable portion 16 likewise is tilted about the tilting axis K.

Thus, It is possible that the pivotable portion 16 can be tilted about the tilting axis K, when the tilting region 30 correspondingly is tilted by the electrostatic drive 34, and can be swiveled about the swivel axis S, when the conductor path 28 arranged in a coil-shaped manner is energized correspondingly. The receiving unit 18, which is arranged on the pivotable portion 16, thus is adjustable about two axes K, S, whereby a correspondingly large detection range is associated to the radiation detection means 10. Since the tilting axis K and the swivel axis S are vertical to each other, the radiation detection means 10 substantially can cover the entire plane lying before the same. The pivotable portion 16 is adjustable about both the tilting axis K and the swivel axis S by up to 20° each.

The carrier 12, which consists of the pivotable portion 16, the frame-like element 14 and the tilting region 30, can be constructed monolithically, wherein the corresponding tilting webs 32 and swivel webs 22 are formed by milling out. The carrier 12 can be a printed circuit board or a chip.

Figure 3:
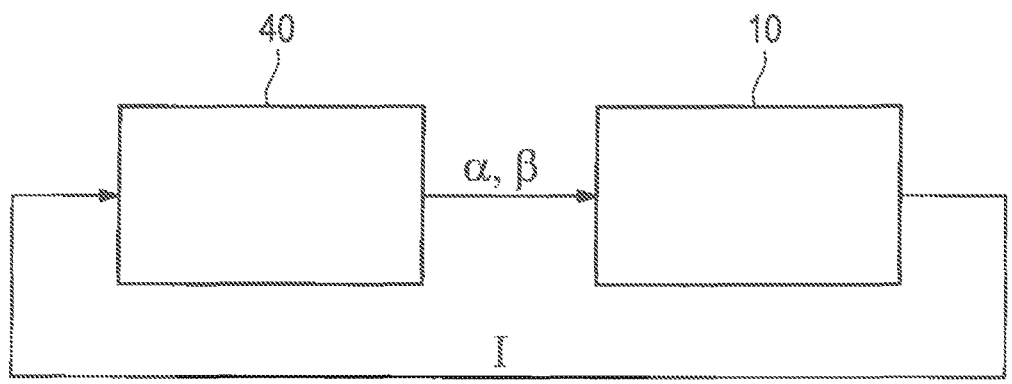
FIG. 3 shows a schematic representation of the control of the radiation detection means.
Figure 4:
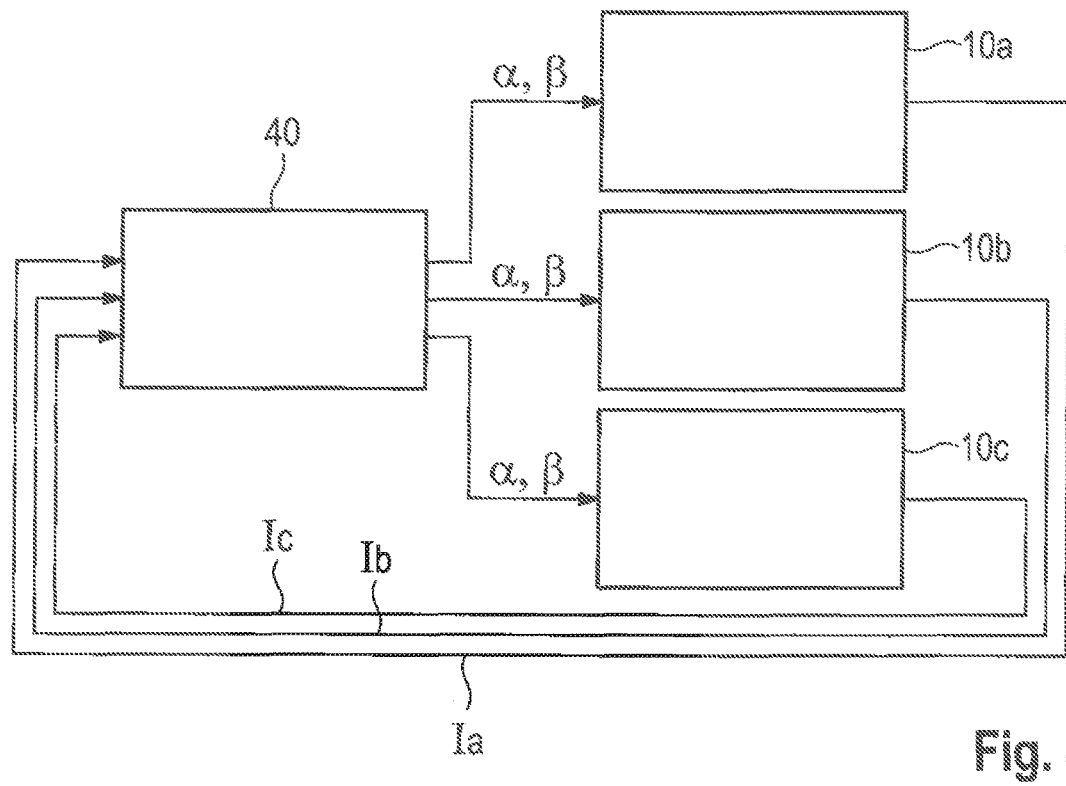
FIG. 4 shows a schematic representation of the control of a plurality of radiation detection means by an evaluation and control unit.

The control and the evaluation of the radiation detection means 10 are shown schematically in FIG. 3. There is provided an evaluation and control unit 40 which controls the radiation detection means 10, in particular the drives 24 and 34, such that the receiving unit 18 detects a rather large radiation intensity I. The evaluation and control unit 40 independently energizes the drive 24 and the drive 34, so that the pivotable portion 16 of the radiation detection means 10 can be adjusted independently by a horizontal angle α and a vertical angle β.

The objective of the evaluation and control unit 40 is to align the radiation detection means 10 and in particular the receiving unit 13 relative to the radiation source, whereby the radiation intensity I is maximized. The drives 24, 34 initially are energized iteratively by the evaluation and control unit 40, wherein the resultant radiation Intensity I is measured. Since the drives 24, 34 are designed as electric drives 24, 34, it is possible to adjust the pivotable region 16 with a high frequency. This ensures that the radiation detection means 10 quickly can align itself such that the received intensity I is maximized, whereby it is possible to follow the movement of the radiation source.

The evaluation and control unit 40 in addition can include an intelligent algorithm and a memory, so that the last actuations are stored. The pivotable portion 16 thereupon is adjusted in a first step corresponding to an extrapolated movement of the radiation source.

The evaluation and control unit 40 merely receives a current signal from the radiation detection means 10, which is proportional to the radiation intensity I which the receiving unit 18 has received. Accordingly, the receiving unit 18 can be constructed with a single channel, as it merely emits a current signal which is evaluated by the evaluation and control unit 40.

Furthermore, it is conceivable that the evaluation and control unit 40 is associated to a plurality of radiation detection means 10 and correspondingly controls and evaluates the same. For this purpose, an intelligent algorithm is deposited in the evaluation and control unit 40, which independently controls the radiation detection means 10a to 10c and correspondingly associates the received radiation intensities 1a to 1c to the radiation detection means 10a to 10c.

In general, it hence is possible to for example detect light sources or heat sources. For example, the radiation detection means 10 according to the invention can be used for a safety and vehicle assistance system of a motor vehicle, wherein the receiving unit 18 is a photodiode which detects preceding motor vehicles with reference to the taillights and controls the distance to the preceding vehicle. Alternatively, the radiation detection means 10 according to the invention can be used in a vehicle assistance system such as a high-beam assistance system, wherein the light of oncoming vehicles is detected.

In a further alternative, the radiation detection means 10 according to the invention also can be used for the interior space of a motor vehicle, wherein the receiving unit 18 is a bolometer which reacts to thermal radiation, Accordingly, the radiation detection means 10 can register the position of a head, for example, and due to this can control corresponding safety and vehicle assistance systems. Such safety assistance system for example can be an alertness assistant. Furthermore, the triggering characteristics of an airbag can be controlled corresponding to the head position.

Alternatively, a gesture recognition and a resulting control of the on-board electronics by a vehicle assistance system with such radiation detection means 10 also is possible. For this purpose the receiving unit 18 registers for example the position of a hand.

In particular, it is conceivable to use an evaluation and control unit 40 which is associated to a plurality of radiation detection means 10, wherein each radiation detection means 10 includes a plurality of pivotable portions 16 with receiving units 18.

For example, there can be provided two radiation detection means 10 according to the invention, wherein one of the two radiation detection means 10 is associated to the interior space of a vehicle and the other one is associated to the surroundings of the vehicle. The radiation detection means 10 associated to the surroundings in addition can include a plurality of pivotable portions 16 with receiving units 18, wherein one receiving unit 18 can be provided for a high-beam assistance system and another one can be provided for a person recognition system.

It becomes clear that with the radiation detection means 10 according to the invention and with the vehicle assistance systems equipped therewith a wide variety of possibilities of use are available.

The invention claimed is:

1. A radiation detection means (10), comprising a carrier (12) which includes at least one pivotable portion (16), a receiving unit (18), a drive (24) and an evaluation and control unit (40), wherein the radiation detection means (10) is configured to detect and track a radiation source, the evaluation and control unit (40) is configured to align the radiation detection means (10) relative to the radiation source such that the radiation intensity (I) is maximized, the receiving unit (18) is arranged on the pivotable portion (16) which together with the receiving unit (18) is pivotable about at least one axis (S) relative to the carrier (12), the evaluation and control unit (40) is connected to the drive (24) and the recieving unit (18), the drive (24) is associated with the pivotable portion (16), and the carrier (12) is constructed monolithically with the pivotable portion (16).

2. The radiation detection means (10) according to claim 1, wherein the carrier (12) is a chip.

3. The radiation detection means (10) according to claim 1, wherein a collecting lens (20) is provided, which cooperates with the receiving unit (18).

4. The radiation detection means (10) according to claim 1, wherein the receiving unit (18) is of the single-channel type.

5. The radiation detection means (10) according to claim 1, wherein the drive (24) is of the electrodynamic type.

6. The radiation detection means (10) according to claim 1, wherein at least one conductor path (28) is arranged on the pivotable portion (16) in a coil-shaped manner.

7. The radiation detection means (10) according to claim 1, wherein there is provided a permanent magnet (26) associated with the pivotable portion (16).

8. The radiation detection means (10) according to claim 1, wherein the drive (24) is of the electrostatic type.

9. The radiation detection means (10) according to claim 1, wherein the receiving unit (18) is a photodiode.

10. The radiation detection means (10) according to claim 1, wherein the receiving unit (18) is a bolometer.

11. The radiation detection means (10) according to claim 1, wherein the pivotable portion (16) is adjustable about two axes (S, K) which are perpendicular to each other.

12. The radiation detection means (10) according to claim 11, wherein two drives (24, 34) are provided, which are of the electrodynamic and/or electrostatic type, wherein one drive (24, 34) is provided for pivoting the pivotable portion (16) about one axis (S, K) each.

13. The radiation detection means (10) according to claim 1, wherein two or more pivotable portions (16) are provided, which each include a receiving unit (18).

14. A safety and vehicle assistance system for a motor vehicle with at least one radiation detection means (10) according to claim 1.

15. The safety and vehicle assistance system according to claim 14, wherein the radiation detection means (10) detects the position of a body part of a vehicle occupant, in particular the position of a head.

16. The safety and vehicle assistance system according to claim 14, wherein the radiation detection means (10) detects the position of radiation sources of oncoming and/or preceding vehicles and/or living beings.

17. A method for controlling a radiation detection means (10) according to claim 1, with the following steps:
a) detecting a radiation source with the receiving unit (18),
b) evaluating the radiation intensity (I) of the radiation source received by the receiving unit (18) by the evaluation and control unit (40),
c) evaluating the angular incidence of the radiation emitted by the radiation source by the evaluation and control unit (40),
d) aligning the radiation detection means (10) relative to the radiation source such that the radiation intensity (I) is maximized by energizing and controlling a drive (24, 34) with the evaluation and control unit (40) to pivot the pivotable portion (16) about at least one axis (S, K),
wherein steps a) to d) can be repeated iteratively any number of times to track the radiation source.

18. The method according to claim 17, wherein the evaluation and control unit (40) can be associated to a plurality of receiving units (18).

19. The radiation detection means (10) according to claim 12, wherein the carrier (12) includes a frame-like element (14) that encloses a tilting region (30), and wherein the electrostatic type drive (34) includes a comb structure (36) formed on the frame-like element (14) and an opposite comb structure (38) formed on the tilting region (30), the comb structure (36) and opposite comb structure (38) engaging each other.

20. The radiation detection means (10) according to claim 1, wherein the receiving unit (18) is configured to detect the radiation source, and the receiving unit (18), the pivotable portion (16), the drive (24) and the evaluation and control unit (40) are collectively configured to track the radiation source.

* * * * *

UNITED STATES PATENT AND TRADEMARK OFFICE
CERTIFICATE OF CORRECTION

PATENT NO.         : 9,714,867 B2
APPLICATION NO.    : 14/647994
DATED              : July 25, 2017
INVENTOR(S)        : Ulrich Backes It is certified that error appears in the above-identified patent and that said Letters Patent is hereby corrected as shown below:

In the Claims

Column 7, Line 14, Claim 1 reads "recieving" should read --receiving--

Signed and Sealed this
Fifth Day of September, 2017

Joseph Matal
*Performing the Functions and Duties of the*
*Under Secretary of Commerce for Intellectual Property and*
*Director of the United States Patent and Trademark Office*